(12) United States Patent
Shirataki et al.

(10) Patent No.: US 8,931,609 B2
(45) Date of Patent: Jan. 13, 2015

(54) ROLLER-TYPE ONE-WAY CLUTCH

(75) Inventors: Hirobumi Shirataki, Fukuroi (JP);
Shinya Okuma, Fukuroi (JP);
Tomoharu Ando, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 421 days.

(21) Appl. No.: 12/679,947

(22) PCT Filed: Apr. 1, 2008

(86) PCT No.: PCT/JP2008/056840
§ 371 (c)(1),
(2), (4) Date: Mar. 25, 2010

(87) PCT Pub. No.: WO2009/110105
PCT Pub. Date: Sep. 11, 2009

(65) Prior Publication Data
US 2010/0258398 A1  Oct. 14, 2010

(30) Foreign Application Priority Data
Mar. 6, 2008  (JP) .................................. 2008-056210

(51) Int. Cl.
*F16D 41/066* (2006.01)
*F16D 41/067* (2006.01)

(52) U.S. Cl.
CPC ............ *F16D 41/066* (2013.01); *F16D 41/067* (2013.01)
USPC ................................. 192/45.016; 192/45.008

(58) Field of Classification Search
USPC ........ 192/44, 45.001, 45.008, 45.019, 45.016
See application file for complete search history.

(56) References Cited

U.S. PATENT DOCUMENTS

| 2,684,139 | A | * | 7/1954 | Lewis | ......................... 192/45.02 |
| 2,902,125 | A | * | 9/1959 | House et al. | ............. 192/45.019 |
| 3,011,606 | A | * | 12/1961 | Ferris et al. | ............. 192/45.008 |
| 3,087,589 | A | * | 4/1963 | Gorsky | .................... 192/45.019 |
| 3,087,590 | A | * | 4/1963 | Gorsky | .................... 192/45.019 |
| 3,656,591 | A | | 4/1972 | Marland et al. | |

(Continued)

FOREIGN PATENT DOCUMENTS

| CN | 2355923 Y | 12/1999 |
| CN | 1592667 A | 3/2005 |

(Continued)

OTHER PUBLICATIONS

Office Action issued Jun. 21, 2012 in Chinese Patent Application No. 200880126102.0.

(Continued)

*Primary Examiner* — Troy Chambers
*Assistant Examiner* — Ryan Dodd
(74) *Attorney, Agent, or Firm* — Miles & Stockbridge P.C.

(57) ABSTRACT

The present invention provides a roller type one-way clutch comprising an outer race in which pockets provided at their inner surfaces with cam surfaces are formed, an inner race spaced apart from the outer race in a radial inner diameter side and disposed coaxially with the outer race for a relative rotational movement and having an annular outer peripheral track surface, a roller disposed within the pocket to be engaged with the cam surfaces and adapted to transmit torque between the outer race and the inner race, and an accordion spring disposed within the pocket and adapted to bias the rollers to be engaged with the cam surfaces, and wherein one end of each accordion spring is secured to an axial end face of the outer race.

9 Claims, 5 Drawing Sheets

(56) References Cited

U.S. PATENT DOCUMENTS

| | | | |
|---|---|---|---|
| 4,932,508 A | | 6/1990 | Lederman |
| 5,265,706 A | * | 11/1993 | Iga .................. 192/42 |
| 5,279,400 A | | 1/1994 | Riggle et al. |
| 5,328,010 A | | 7/1994 | Lederman |
| 8,002,096 B2 | * | 8/2011 | Shirataki et al. ......... 192/45.016 |
| 8,413,778 B2 | * | 4/2013 | Takasu et al. ............ 192/45.016 |
| 8,434,605 B2 | * | 5/2013 | Shirataki et al. ......... 192/45.016 |
| 2004/0139743 A1 | | 7/2004 | Sato |
| 2005/0034951 A1 | | 2/2005 | Takasu |
| 2007/0246318 A1 | | 10/2007 | Shirataki et al. |
| 2008/0210508 A1 | * | 9/2008 | Heisey et al. ................... 192/44 |
| 2009/0242346 A1 | | 10/2009 | Kinoshita |
| 2009/0301257 A1 | * | 12/2009 | Shirataki et al. ................ 74/7 C |
| 2010/0116611 A1 | | 5/2010 | Shirataki et al. |

FOREIGN PATENT DOCUMENTS

| | | |
|---|---|---|
| JP | 60-049134 A | 3/1985 |
| JP | 08-061192 A | 3/1996 |
| JP | 10-9292 A | 1/1998 |
| JP | 2003-172377 A | 6/2003 |
| JP | 2004-346951 A | 12/2004 |
| JP | 2007-064475 A | 3/2007 |
| TW | M300266 | 11/2006 |

OTHER PUBLICATIONS

English Translation of Office Action issued Jan. 15, 2013, in Taiwan Patent Application No. 097112436.

Office Action issued Feb. 4, 2013, in Chinese Patent Application No. 200880126102.0.

* cited by examiner

ROLLER-TYPE ONE-WAY CLUTCH

TECHNICAL FIELD

The present invention relates to a roller type one-way clutch used as a part such as a torque transmitting member or a back stopper in a driving apparatus of an automobile, an industrial machine or the like, for example.

BACKGROUND ART

In general, a roller type one-way clutch is constituted by an outer race, an inner race disposed coaxially with the outer race, a plurality of rollers disposed between an outer peripheral surface of the inner race and an inner peripheral cam surface of the outer race and adapted to transmit torque, and springs contacted with the rollers at an idle rotation side.

With this arrangement, in the one-way clutch, the inner race is rotated only in one direction with respect to the outer race by a cam mechanism constituted by the rollers and the cam surface. That is to say, the inner race is designed so that the inner race is idly rotated with respect to the outer race in one direction and serves to transmit rotational torque to the outer race via the cam mechanism only in the opposite direction.

In general, in the roller type one-way clutch, i order to obtain positive engagement, the rollers as torque transmitting members and the springs for biasing the rollers are arranged in respective pockets formed in the outer race or the inner race.

Particularly, in a roller type one-way clutch for a motor bike, since the number of rollers is small (for example, three or six), if all of the rollers are not engaged with the corresponding cam surfaces positively, a design torque capacity may not be obtained. Thus, it is important that the springs for biasing the rollers are operated stably.

Japanese Patent Application Laid-open No. 2003172377 discloses a technique in which cage portions are provided in pockets to prevent the rollers and the springs from dislodging toward an inner peripheral side of the outer race. However, this document does not teach the fact that the springs are secured to the outer race.

If accordion springs are merely held with respect to the outer race, relative positions between the accordion springs and the outer race cannot be determined or stabilized, with the result that, when the springs are slidingly contacted with an inner diameter portion of the outer race, an outer diameter portion of a cage or a track surface of the inner race, the springs may be worn or damaged by wear. Further, there arose a problem that, in operation, movements of the springs cannot be stabilized, with the result that it is hard to obtain smooth movements.

DISCLOSURE OF THE INVENTION

Accordingly, an object of the present invention is to provide a roller type one-way clutch in which fluctuation in relative positions between accordion springs and an outer race is eliminated, so that the accordion springs are not slidingly contacted with an inner diameter portion of the outer race, an outer diameter portion of a cage or a track surface of an inner race, thereby preventing the springs from being worn and/or damaged by wear and in which movements of the accordion springs is stabilized during operations thereof.

To achieve the above object, the present invention provides a roller type one-way clutch comprising an outer race in which pockets provided at their inner surfaces with cam surfaces are formed, an inner race spaced apart from the outer race in a radial inner diameter side and disposed coaxially with the outer race for a relative rotational movement and having an annular outer peripheral track surface, a roller disposed within the pocket to be engaged with the cam surfaces and adapted to transmit torque between the outer race and the inner race, and an accordion spring disposed within the pocket and adapted to bias the rollers to be engaged with the cam surfaces, and wherein one end of each accordion spring is secured to an axial end face of the outer race.

Further, the accordion spring may be bent in an axial direction.

Further, the one end of the accordion spring may be secured to the axial end face of the outer race by welding.

Further, the one end of the accordion spring may be secured to the axial end face of the outer race by spot welding.

The one end of the accordion spring may be secured to the axial end face of the outer race by an adhesive.

The one end of the accordion spring may be secured to the axial end face of the outer race by solder.

The roller type one-way clutch may include a cage having a cylindrical portion and a flange portion extending from the cylindrical portion toward an outer diameter direction and having windows formed in the cylindrical portion and adapted to hold the plurality of rollers, and the flange portion extending toward the outer diameter direction is formed on an axial one end portion of the cylindrical portion.

An inner peripheral surface of the outer race may be provided at its axial edge with an annular stepped portion with which the flange portion of the cage is engaged.

According to the roller type one-way clutch of the present invention, the following effects can be obtained.

With the arrangement in which the accordion spring is secured to the outer race, since the relative position between the accordion spring and the outer race is not fluctuated, it is possible to prevent the wear and/or damage of the spring due to the sliding contact between the spring and the inner diameter portion of the outer race, the outer diameter portion of the cage or the track surface of the inner race.

Further, since the operating movement of the spring is not influenced by the outer race and the cage, the stable and smooth movement can be achieved. As a result, an engaging ability of the roller is enhanced.

With the arrangement in which the inner peripheral surface of the outer race is provided at its axial edge with the annular stepped portion with which the flange portion of the cage is engaged, since it is not required to reduce an axial length of the outer race by an amount corresponding to the thickness of the flange portion, the axial length of the outer race can be reserved.

Further, since the rollers and the springs can be prevented from being dislodged in axial and radial directions, the rollers can be engaged positively even under an environmental condition where great vibration would be generated, for example, in a motor bike and the like.

Further features of the present invention will become apparent from the following description of exemplary embodiments with reference to the attached drawings.

BEST MODES FOR CARRYING OUT THE INVENTION

Now, embodiments of the present invention will be fully explained with reference to the accompanying drawings. Incidentally, it should be noted that the embodiments described hereinafter are merely examples of the present invention and various alterations can be made within the present invention.

(First Embodiment)

Figure 1:
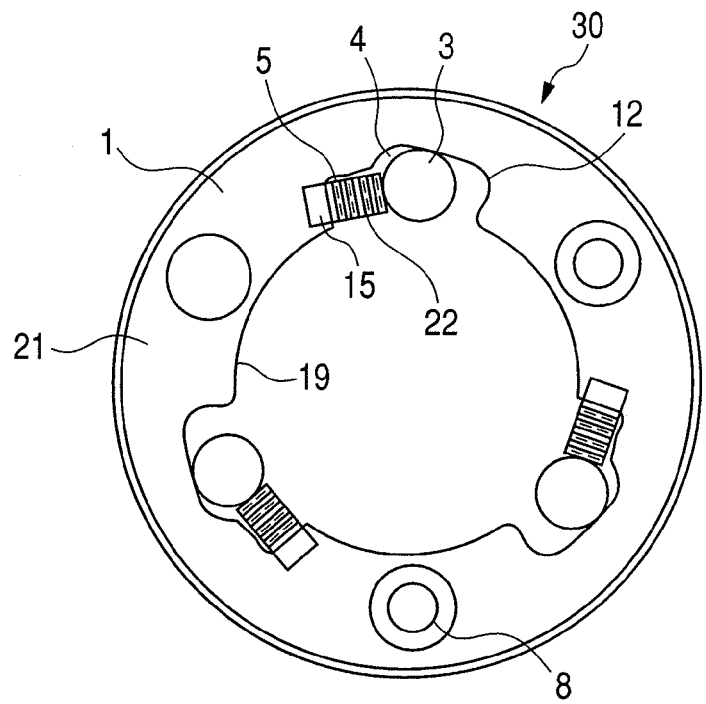
FIG. 1 is a front view of a roller type one-way clutch according to a first embodiment of the present invention, showing a condition before the clutch is engaged.
Figure 2:
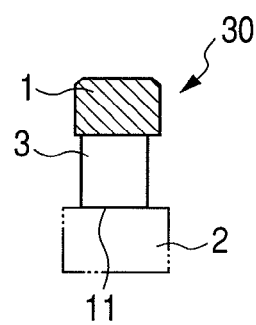
FIG. 2 is an axial sectional view of FIG. 1.
Figure 2:
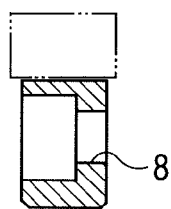

FIG. 1 is a front view of a roller type one-way clutch according to a first embodiment of the present invention and FIG. 2 is an axial sectional view of FIG. 1. In FIG. 2, an inner race 2 is shown by the imaginary line.

FIGS. 1 and 2 show a condition before rollers are engaged, i.e. an unlocked or idle rotation condition of the one-way clutch. In the illustrated embodiment, the inner race 2 is idly rotated.

As shown in FIG. 1, a roller type one-way clutch 30 comprises an annular outer race 1 provided at its inner periphery with pockets 4 formed as recessed portions having cam surfaces 12, an inner race 2 (shown by the imaginary line in FIG. 2) spaced apart from the outer race 1 radially inwardly and disposed coaxially with the outer race for a relative rotational movement and having an annular outer peripheral track surface 11, and a plurality of rollers 3 disposed within the corresponding pockets 4 and adapted to transmit torque between the outer peripheral track surface 11 of the inner race 2 and the cam surfaces 12.

In the illustrated embodiment, three pockets 4 are provided in the inner periphery of the outer race 1 equidistantly along a circumferential direction. Further, three stepped bolt holes 8 used for securing the outer race 1 to an output/input member (not shown) and extending through in an axial direction are also provided in the outer race equidistantly along the circumferential direction. As shown in FIG. 1, the pockets 4 and the bolt holes 8 are arranged alternately and equidistantly. Further, it should be noted that the number of the pockets 4 can be selected, for example, between three and six in accordance with the magnitude of the torque.

As shown in FIG. 1, the roller type one-way clutch 30 has accordion springs 5 disposed within the respective pockets 4 and adapted to bias the rollers 3 toward an engagement direction to engage the rollers with the respective cam surfaces 12.

Figure 5:
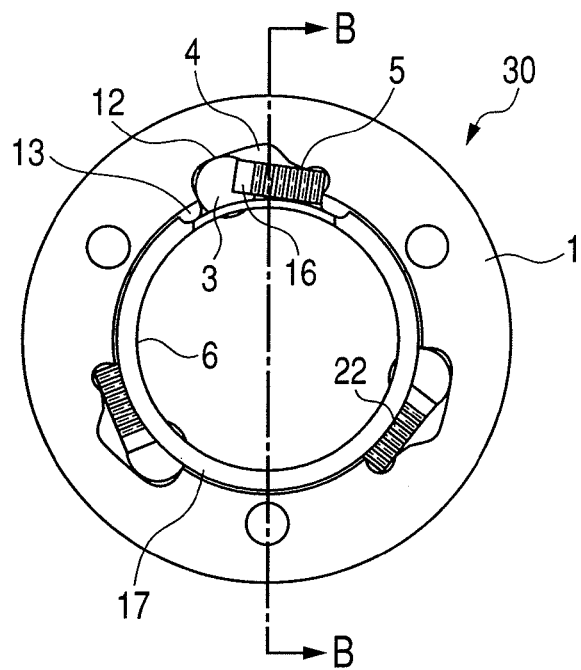
FIG. 5 is a front view looked at from a rear side of FIG. 4.

As shown in FIG. 1, one end i.e. tab 15 of the accordion spring 5 is secured to an axial end face 21 of the outer race 1. Further, as shown in FIG. 5, the other end of the accordion spring 5 is pinched between an axial end face of the roller 3 and a flange portion 17 of a cage 6 to form a tab 16. With this arrangement, the spring 5 itself is supported in a fixed condition with respect to the outer race 1 and, at the same time, can prevent the roller 3 from being dislodged in the axial direction by the tab 16.

Figure 8:
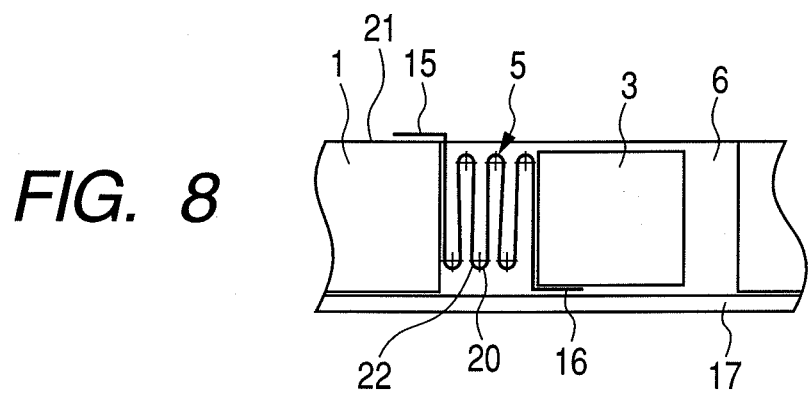
FIG. 8 is a partial side view looked at from an inner diameter side of FIG. 7.

As shown in FIG. 8, the accordion spring 5 includes a bellows-shaped bellows portion 22 bent in the axial direction of the accordion spring 5. The bellows portion 22 can be expanded and contracted so as to apply a biasing force to the roller 3 thereby to engage the roller 3 with the corresponding cam surface 12.

The tab 15 of the accordion spring 5 is secured to the axial end face 21 of the outer race 1 by welding, spot welding, adhesive, solder or the like. It should be noted that other securing methods may be used.

Since the accordion spring 5 is secured to the axial end face 21 of the outer race 1, a relative position between the accordion spring 5 and the outer race 1 is almost not changed or fluctuated. Thus, it is possible to prevent wear and/or damage of the accordion spring 5 due to a sliding contact between the accordion spring 5 and an inner diameter portion of the outer race, an outer diameter portion of the cage or the track surface of the inner race.

Further, since an operating movement of the accordion spring 5 is not influenced by the outer race 1 and the cage 6, the stable and smooth movement can be achieved. As a result, an engaging ability of the roller is enhanced.

(Second Embodiment)

Figure 4:
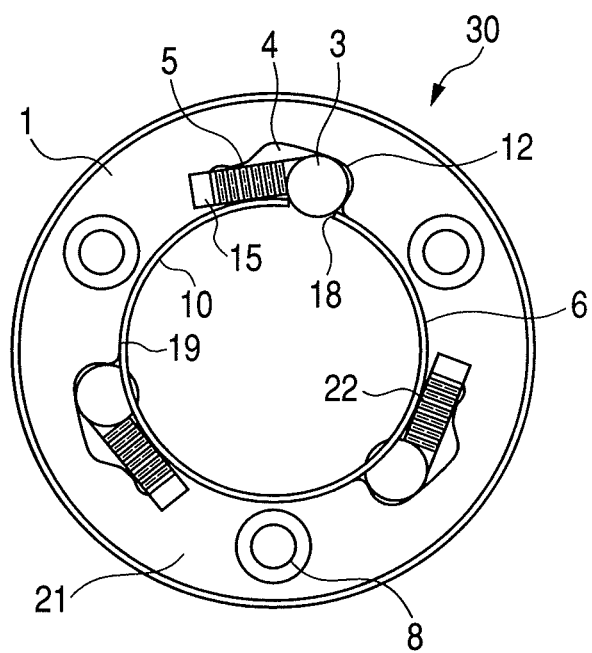
FIG. 4 is a front view showing the roller type one-way clutch according to the second embodiment of the present invention.
Figure 6:
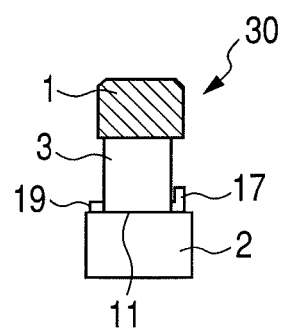
FIG. 6 is an axial sectional view taken along the line B-B in FIG. 5.
Figure 6:
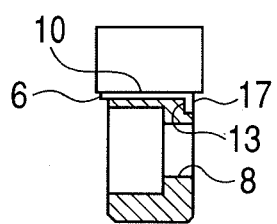

FIG. 4 is a front view of a roller type one-way clutch according to a second embodiment of the present invention, and FIG. 5 is a front view looked at from a rear side of FIG. 4. Further, FIG. 6 is an axial sectional view taken along the line B-B in FIG. 5. In the second embodiment, a cage 6 is provided at an inner diameter side of an outer race 1.

FIGS. 4 to 6 show a condition that rollers are engaged by cam surfaces, i.e. a locked condition that the one-way clutch is engaged under a high load.

As shown in FIGS. 4 and 5, the one-way clutch 30 comprises a cage 6 for holding rollers 3, and the cage 6 has a cylindrical portion 10 and an annular flange portion 17 extending radially outwardly from an axial one end of the cylindrical portion 10. Further, the cage 6 has windows 18 extending through the cage in a radial direction, and the number of the windows corresponds to the number of the rollers 3. Incidentally, in FIG. 5, the flange portion 17 is shown as being partially broken to reveal a pocket 4.

The window 18 formed in the cylindrical portion 10 of the cage 6 extends through the cage in the radial direction, and, in the axial direction, the window is closed both at an end near the flange portion 17 and at an end 19 opposite to the flange portion 17. That is to say, the roller 3 is seated in the substantially rectangular window 18 and is supported by four edges of the window 18. In order to show a relationship between the window 18 and the roller 3, in FIG. 1 (also in FIG. 4 described hereinafter), the uppermost window 18 is shown in a condition that the end 19 thereof is broken.

Since an axial one end of the roller 3 is supported by the tab 16 of the accordion spring 5 and one edge of the window 18 and the other axial end is supported by one edge of the window 18, the roller is prevented from being dislodged in the axial direction. In this case, if a projection or the like is provided on the tab 16 to slightly urge the axial end face of the roller 3, the roller 3 is held in the window 18 more positively.

As shown in FIGS. 5 and 6, an annular stepped portion 13 is provided at an axial edge of the inner peripheral surface of the outer race 1 and the flange portion 17 of the cage 6 is engaged by the stepped portion 13. An axial depth of the stepped portion 13 is slightly greater than a thickness of the flange portion 17, so that, when the flange portion 17 is engaged by the stepped portion 13, the axial end face (end face opposite to the axial end face 21) of the outer race 1 becomes flush with the axial end face of the flange portion 17. Further, an outer diameter of the stepped portion 13 is slightly greater than an outer diameter of the flange portion 17 of the cage 6, so that the flange portion 17 is engaged by the stepped portion 13 with predetermined clearance.

Thus, since it is not needed to reduce an axial length of the outer race 1 by an amount corresponding to the thickness of the flange portion 17, the axial length of the outer race 1 can be maintained adequately, and a margin of engagement between the cam surface 12 and the roller 3 is left. Further, the axial length can be reduced without changing the rigidity of the cam surface 12 of the outer race 1.

Figure 3:
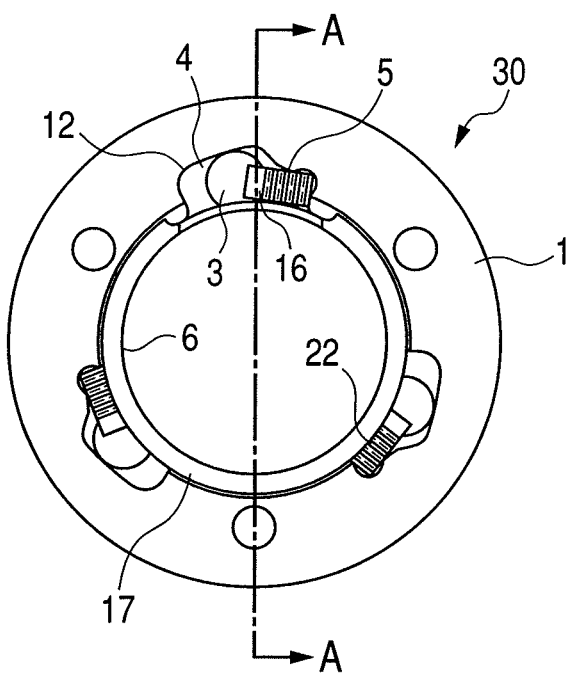
FIG. 3 is a front view of a roller type one-way clutch according to a second embodiment of the present invention, showing a condition before the clutch is engaged.

From the idle condition shown in FIGS. 1 to 3, when a load is applied so at to operate the clutch, the rollers 3 biased by the accordion springs 5 are engaged by the cam surfaces 12 of the pockets 4. In this case, as the rollers 3 are displaced in the circumferential direction, the cage 6 is also shifted together with the rollers 3. Thus, the windows 18 are also shifted together with the rollers 3.

In this case, since the axial one end face of each roller 3 is supported by the tab 16 of the accordion spring 5 and the other end face is supported by the window 18, the roller is prevented from being dislodged in the axial direction, thereby providing the stable operation of the roller.

Each roller 3 is engaged by the corresponding cam surface 12 and, at the same time, a peripheral surface of the roller slightly protruded inwardly from the window 18 is engaged by the outer peripheral surface of the inner race 2. Accordingly, the relative rotation between the outer race 1 and the inner race 2 is locked via the rollers 3.

As mentioned above, since the cage 6 has no rotation presenting means to be rotated freely, the cage 6 can be moved by the rollers 3 themselves, so that each roller 3 can be shifted by a distance greater than the width of the window 18 of the cage 6.

As shown in FIGS. 4 and 6, also in this embodiment, the roller type one-way clutch 30 includes the accordion springs 5 disposed within the respective pockets 4 and adapted to bias the rollers 3 toward the engagement direction along which the rollers 3 are engaged by the cam surfaces 12.

Similar to the first embodiment, one end i.e. tab 15 of the accordion spring 5 is secured to the axial end face 21 of the outer race 1 as shown in FIG. 4 and the other end i.e. tab 16 is pinched between the axial end face of the roller 3 and the flange portion 17 of the cage 6 as shown in FIG. 5. With this arrangement, the accordion spring 5 itself is fixedly supported with respect to the outer race 1 to reduce the fluctuation in the relative position between the outer race 1 and the accordion spring 5 and, at the same time, the roller 3 can be prevented from being dislodged in the axial direction by the tab 16.

According to the second embodiment, similar to the first embodiment, since the accordion spring 5 is secured to the outer race, the relative position between the accordion spring and the outer race is not fluctuated, and, thus, it is possible to prevent wear and/or damage of the accordion spring due to the sliding contact between the accordion spring and the inner diameter portion of the outer race, the outer diameter portion of the cage or the track surface of the inner race.

Further, since the operating movement of the accordion spring is not influenced by the outer race and the cage, the stable and smooth movement can be achieved. As a result, the engaging ability of the roller is enhanced.

Further, in addition to the above-mentioned advantages, with the arrangement in which the annular stepped portion with which the flange portion of the cage is engaged is provided at the axial edge of the inner peripheral surface of the outer race, since it is not required to reduce the axial length of the outer race by the amount corresponding to the thickness of the flange portion, the axial length of the outer race can be reserved.

Further, since the rollers and the springs can be prevented from being dislodged in axial and radial directions, the rollers can be engaged positively even under an environmental condition where great vibration would be generated, for example, in a motor bike and the like.

Figure 7:
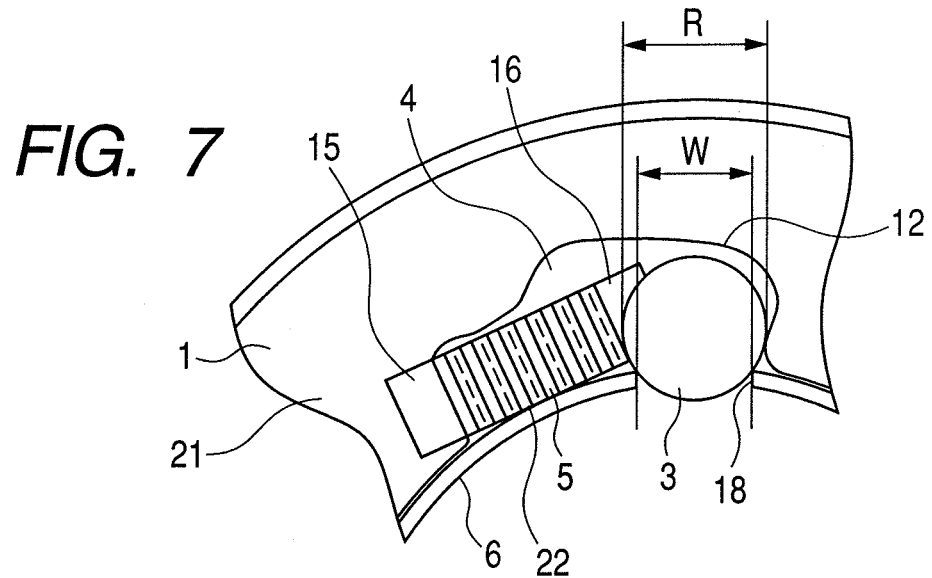
FIG. 7 a partial front view of the roller type one-way clutch before an inner race is mounted.

As shown in FIG. 7, since a circumferential width W of the window 18 of the cage 6 is smaller than a diameter R of the roller 3, the roller 3 can be seated in the window 18. As mentioned above, since the cage 6 is not secured to the outer race 1 and the inner race 2, the cage can be rotated freely; however, since the roller 3 is fitted in the window 18, when the roller 3 is displaced within the pocket 4, the cage 6 is also rotated accordingly.

FIG. 8 is a partial side view looked at from an inner diameter side of FIG. 7. The accordion spring 5 has the tab 15 bent from a bellows-shaped body portion 20 substantially at a right angle and the tab 15 abuts the axial one end face of the outer race 1.

Further, the tab 16 bent from the body portion 20 substantially at a right angle is provided at the end of the spring opposite to the tab 15, which tab 16 abuts the axial one end face of the roller 3.

The tab 16 engaging with the roller 3 is pinched between the axial end face of the roller 3 and the flange portion 17 of the cage 6. Accordingly, the roller 3 can be held in the axial direction by the tab 16. In this way, since the accordion spring 5 is maintained in the fixed condition, the accordion spring 5 is not fluctuated or moved within the pocket 4, thereby preventing the wear of the according spring 5.

Figure 9:
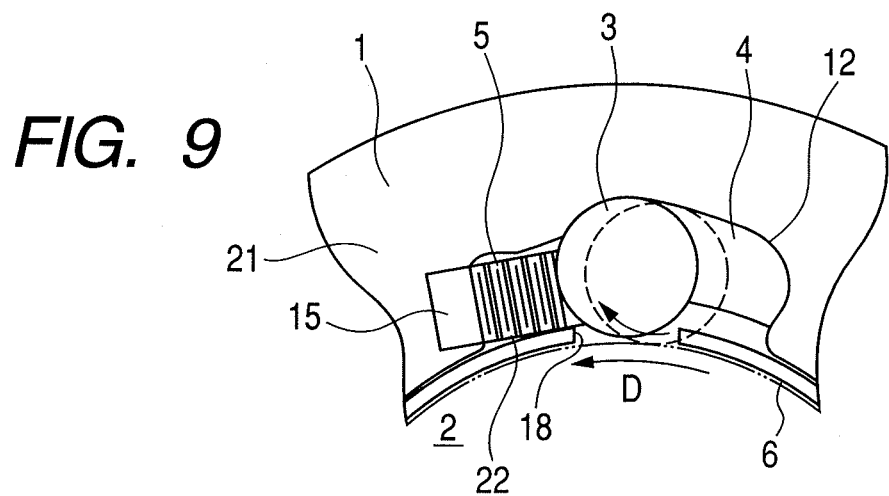
FIG. 9 is a partial front view for explaining an operation of the roller type one-way clutch, in a condition that the inner race is idly rotated.
Figure 10:
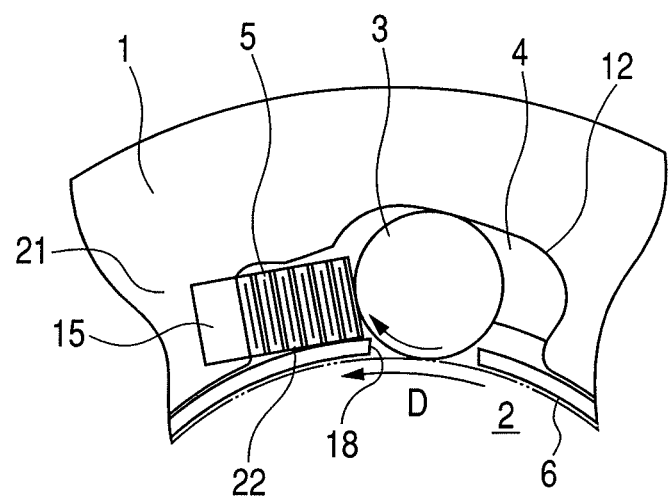
FIG. 10 is a partial front view for explaining the operation of the roller type one-way clutch, in a condition that the inner race is transited from the idle rotation from a reverse rotation.
Figure 11:
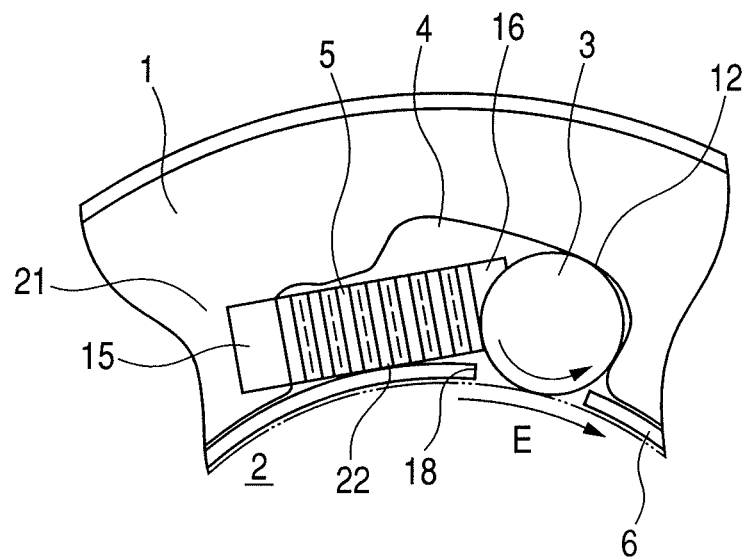
FIG. 11 is a partial front view for explaining an operation of the roller type one-way clutch, in a condition that the inner race is reversely rotated.

FIGS. 9 to 11 are partial front views for explaining an operation of the roller type one-way clutch, where FIG. 9 shows a condition that the inner race 2 is rotated idly, and FIG. 10 shows a condition that the inner race 2 is transited from the idle rotation to a reverse rotation, and FIG. 11 shows a condition that the inner race 2 is rotated reversely.

In FIG. 9, the inner race 2 is rotated (idly) in a direction shown by the arrow D. In this case, as the inner race 2 is rotated, the roller 3 is shifted together with the window 18 of the cage 6 toward the accordion spring 5 within the pocket 4. That is to say, since the roller 3 is shifted together with the cage 6 in the rotational direction of the inner race 2, the roller 3 is displaced to the left in FIG. 9 in opposition to the biasing force of the accordion spring 5 while rotating in the direction shown by the arrow as shown.

FIG. 10 shows a condition that, before the inner race 2 is reversely rotated, the speed of the rotation (idle rotation) toward the direction shown by the arrow is decreased, thereby decreasing the force for displacing the roller 3 to the left. In this condition, although the roller 3 is displaced toward the cam surface 12 by the biasing force of the accordion spring 5, the roller 3 is not yet engaged with the cam surface 12.

When the inner race 2 begins to rotate in an opposite direction of FIGS. 9 and 10 (direction shown by the arrow E in FIG. 11), the load on the roller 3 is removed, with the result that the roller 3 is displaced to a position where it is engaged with the cam surface 12, by the biasing force of the spring 5 and the displacement of the window 18 of the cage 6 shifted due to the reverse rotation of the inner race 2. This condition is shown in FIG. 11. In this case, since the roller 3 is shifted together with the cage 6 by the rotation of the inner race 2 to be rotated in the direction as shown, the roller 3 is engaged with the cam surface 12 positively.

In the high load condition for the engagement shown in FIG. 11, the rotation of the inner race 2 is transmitted to the outer race 1 by the engagement between the roller 3 and the cam surface 12. That is to say, the inner race 2 and the outer race 1 are integrally rotated in the direction shown by the arrow.

Industrial Availability

Although the present invention can be used as a part such as a torque transmitting member or a back stopper in a driving apparatus of an automobile, an industrial machine or the like, for example, the present invention has excellent effects particularly when it is used in a motor bike.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-56210, filed Mar. 6, 2008, which is hereby incorporated by reference herein in its entirety.

The invention claimed is:

1. A roller type one-way clutch comprising:
an outer race having a pocket and a cam surface provided at an inner surface of said pocket;
an inner race spaced apart from said outer race in a radial inner diameter side and disposed coaxially with said outer race for a relative rotational movement and having an annular outer peripheral track surface;
a roller disposed within said pocket to be engaged with said cam surface and adapted to transmit torque between said outer race and said inner race; and
an accordion spring disposed within said pocket and adapted to bias said roller to be engaged with said cam surface,
wherein one end of said accordion spring is fixed immovably to an axial end face of said outer race to maintain a relative position between the outer race and the accordion spring, and another end of the accordion spring is in contact with an axial end face of the roller.

2. A roller type one-way clutch according to claim 1, wherein said accordion spring is bent to form a tab that abuts the axial end face of said outer race and that is fixed to the axial end face immovably.

3. A roller type one-way clutch according to claim 2, wherein said tab of said accordion spring is fixed immovably to the axial end face of said outer race by a weld.

4. A roller type one-way clutch according to claim 3, wherein said tab of said accordion spring is fixed immovably to the axial end face of said outer race by a spot weld.

5. A roller type one-way clutch according to claim 3, wherein said tab of said accordion spring is fixed immovably to the axial end face of said outer race by an adhesive.

6. A roller type one-way clutch according to claim 3, wherein said tab of said accordion spring is fixed immovably to the axial end face of said outer race by solder.

7. A roller type one-way clutch according to claim 1, further comprising a cage including a cylindrical portion and a flange portion extending radially outwardly from said cylindrical portion and having a window provided in said cylindrical portion and adapted to hold said roller, and wherein said flange portion extending radially outwardly is provided at an axial one end of said cylindrical portion.

8. A roller type one-way clutch according to claim 7, wherein an inner peripheral surface of said outer race is provided at an axial edge with a stepped portion with which said flange portion of said cage is engaged.

9. A roller type one-way clutch according to claim 2 wherein said another end of the accordion spring is bent to form a tab that abuts said axial end face of the roller.

* * * * *